March 15, 1960 T. K. MURRAY 2,928,935
DISTRESS SIGNALING DEVICE
Filed Oct. 9, 1958 4 Sheets-Sheet 1
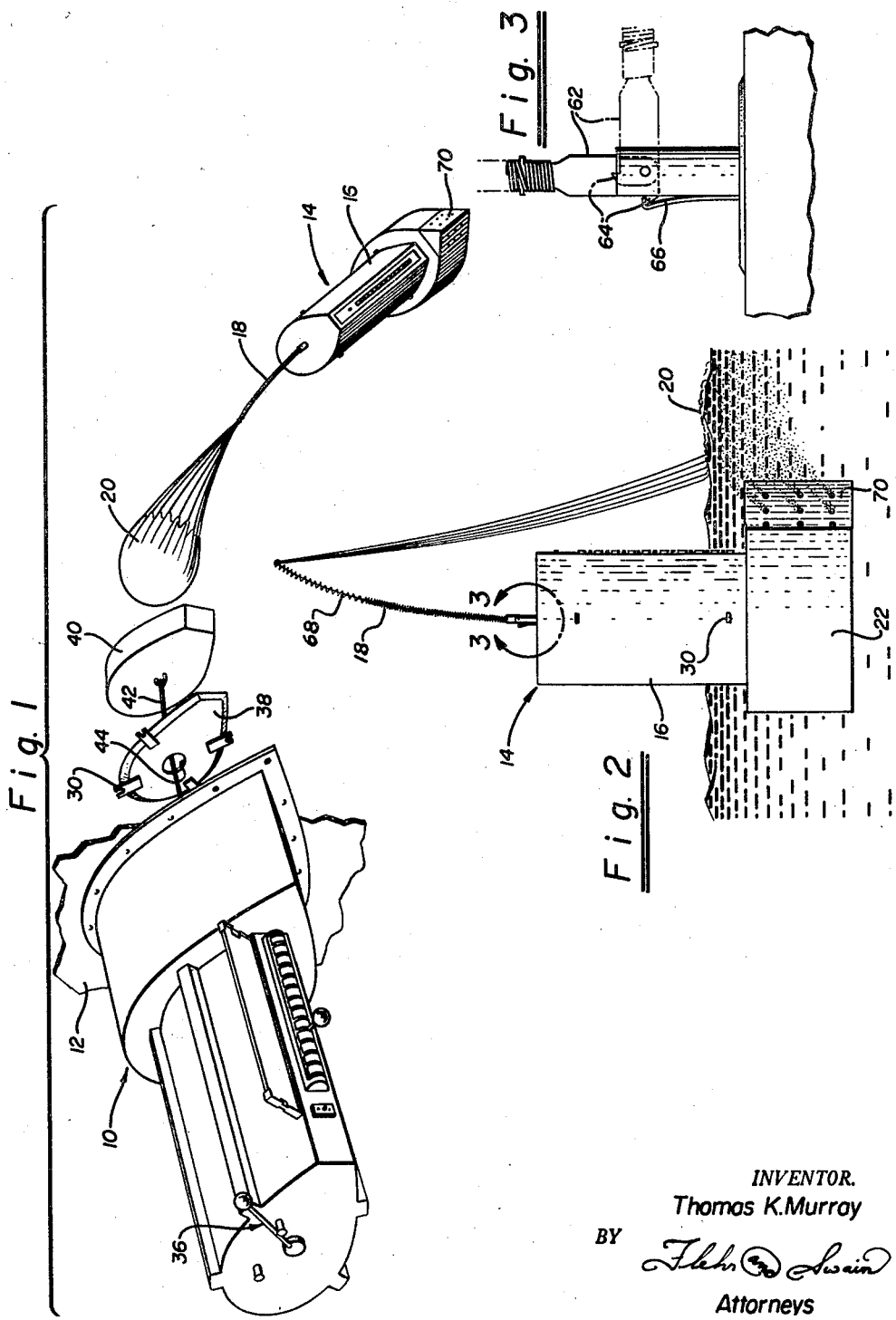
INVENTOR.
Thomas K. Murray
BY
*Fletcher & Swain*
Attorneys March 15, 1960
T. K. MURRAY
2,928,935
DISTRESS SIGNALING DEVICE
Filed Oct. 9, 1958
4 Sheets-Sheet 2
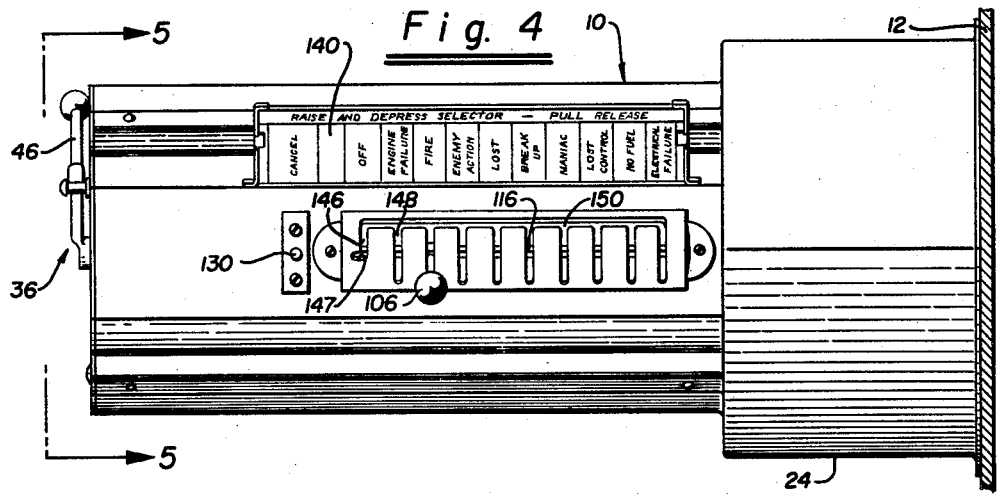
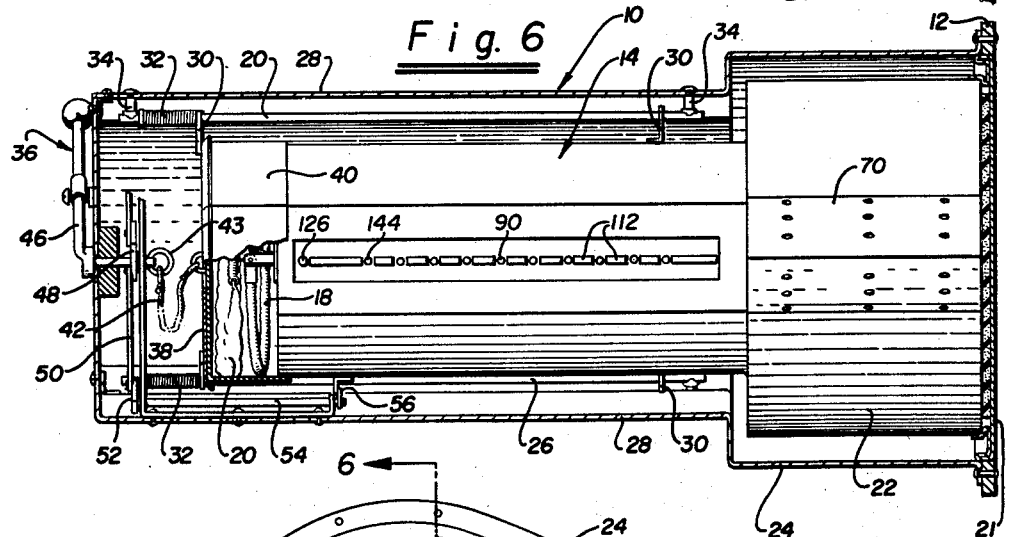
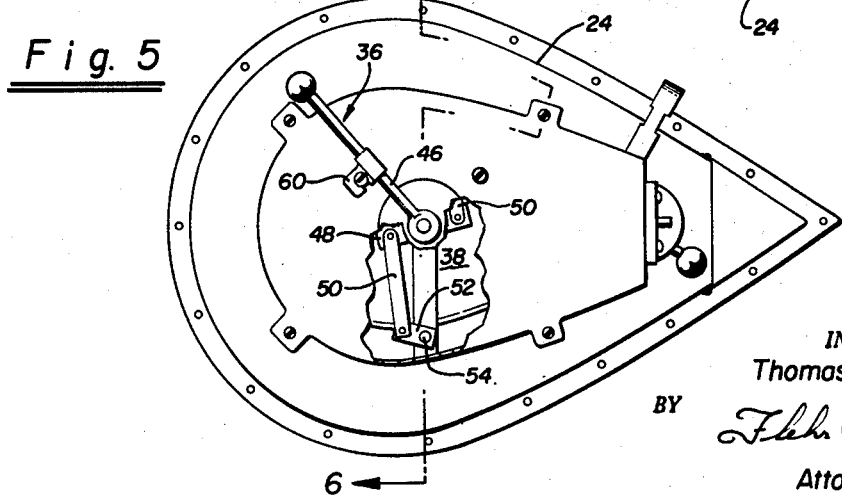
INVENTOR.
Thomas K. Murray
BY
Attorneys March 15, 1960 T. K. MURRAY 2,928,935
DISTRESS SIGNALING DEVICE
Filed Oct. 9, 1958 4 Sheets-Sheet 3

INVENTOR.
Thomas K. Murray
BY
Attorneys

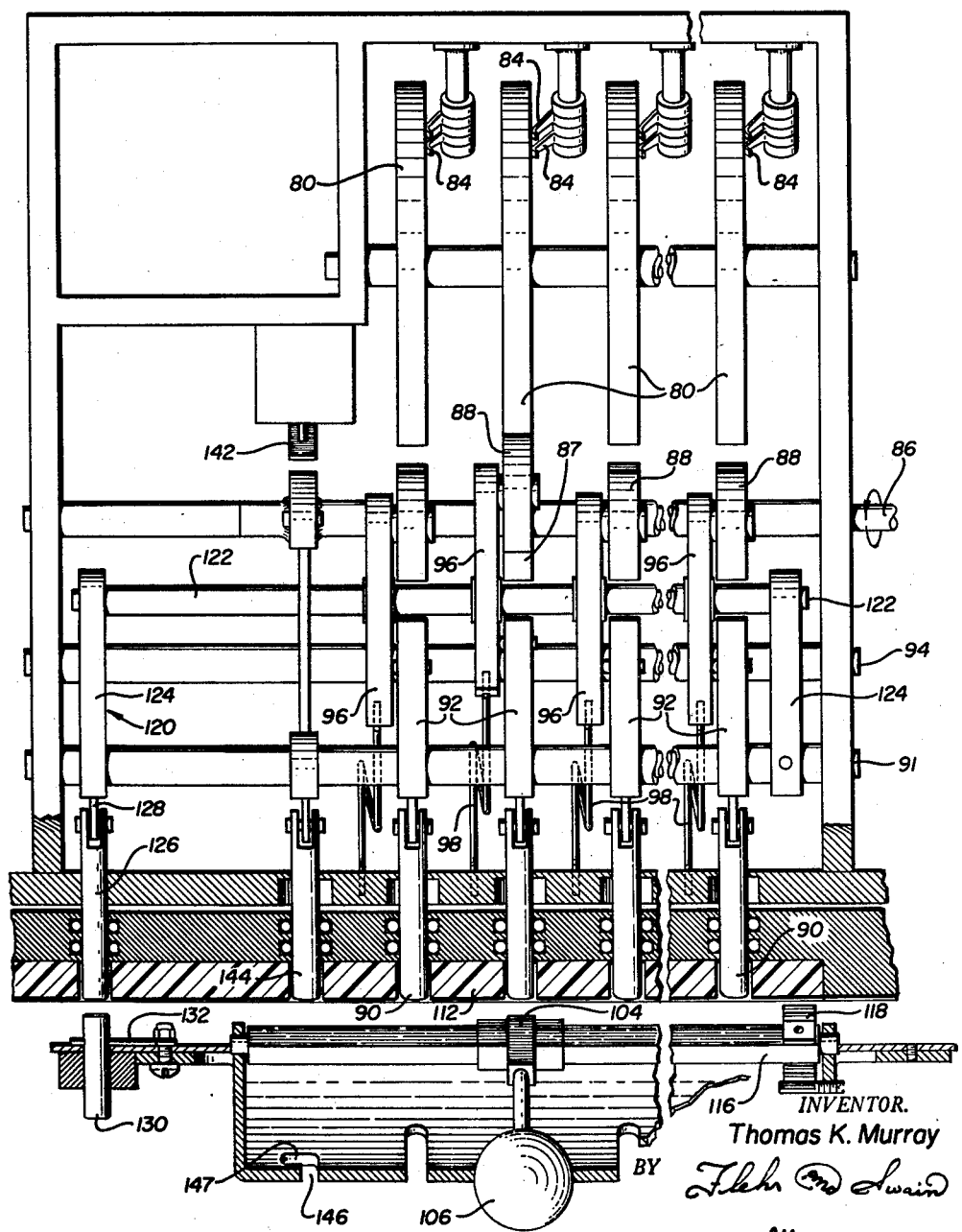

United States Patent Office 2,928,935
Patented Mar. 15, 1960

2,928,935

DISTRESS SIGNALING DEVICE

Thomas K. Murray, San Leandro, Calif.

Application October 9, 1958, Serial No. 766,321

14 Claims. (Cl. 250—17)

This invention relates to emergency radio signaling systems and particularly a distress signaling device for aircraft including a radio transmitter whereby vital information can be automatically transmitted from the vicinity of a crashed airplane and its position located by means of radio direction finders.

As is well known, airplanes all too often meet disaster suddenly without warning so that the pilot or crew of the aircraft have no opportunity to notify land stations of the emergency or the position of the aircraft. Effective rescue, however, requires quick action by rescue forces particularly prepared for the emergency at hand. Lives can be saved only if the maximum possible rescue forces, equipped with the proper gear and supplies, can be concentrated quickly on a minimum search area. One of the principal difficulties encountered in rescue operations therefore is a complete lack of information concerning the disaster, and particularly the precise location of the disabled aircraft. Frequently, days, weeks or months may elapse before the airplane is found. In fact some airplanes have never been located even after years.

The present invention provides for the first time a distress signaling device for aircraft that can be instantaneously ejected to parachute to the earth with transmission of a vital factual and position indicating message. It provides for the first time a self-powered emergency radio transmitter capable of selectively transmitting any one of a series of pre-recorded messages concerning the nature of the emergency. It provides for the first time such a device that may be readily launched from a plane and will automatically right itself on landing, erect an antenna, transmit a predetermined message, and continue to transmit such message so that the transmission can act as a homing device for rescue forces. Because of these many advantages, a vastly improved operating usefulness and efficiency of the emergency device is made possible. Also the irreplaceable lost time due to the difficulties of locating and finding a ditched aircraft is substantially reduced. Other objects and advantages in addition to the above will appear from the following description of a preferred embodiment of the invention and from the drawings in which:

Figure 1 is a view in perspective of a distress signaling device in accordance with the invention, taken at the instant of ejection from the aircraft;

Figure 2 shows the transmitting robot in a subsequent flotation position with the antenna fully extended and the dye compartment flooding to emit dye;

Figure 3 is a detail view along the line 3—3 of Figure 2, illustrating the means for locking the antenna in extended position;

Figure 4 is a side elevational view of the distress signaling device in an assembled position within the aircraft;

Figure 5 is an end elevational view of the same, with parts broken away to show the release mechanism;

Figure 6 is a view in section and elevation along the line 6—6 of Figure 5;

Figure 8 is a view in horizontal section and elevation of the mechanism of Figure 7.

Figure 7:
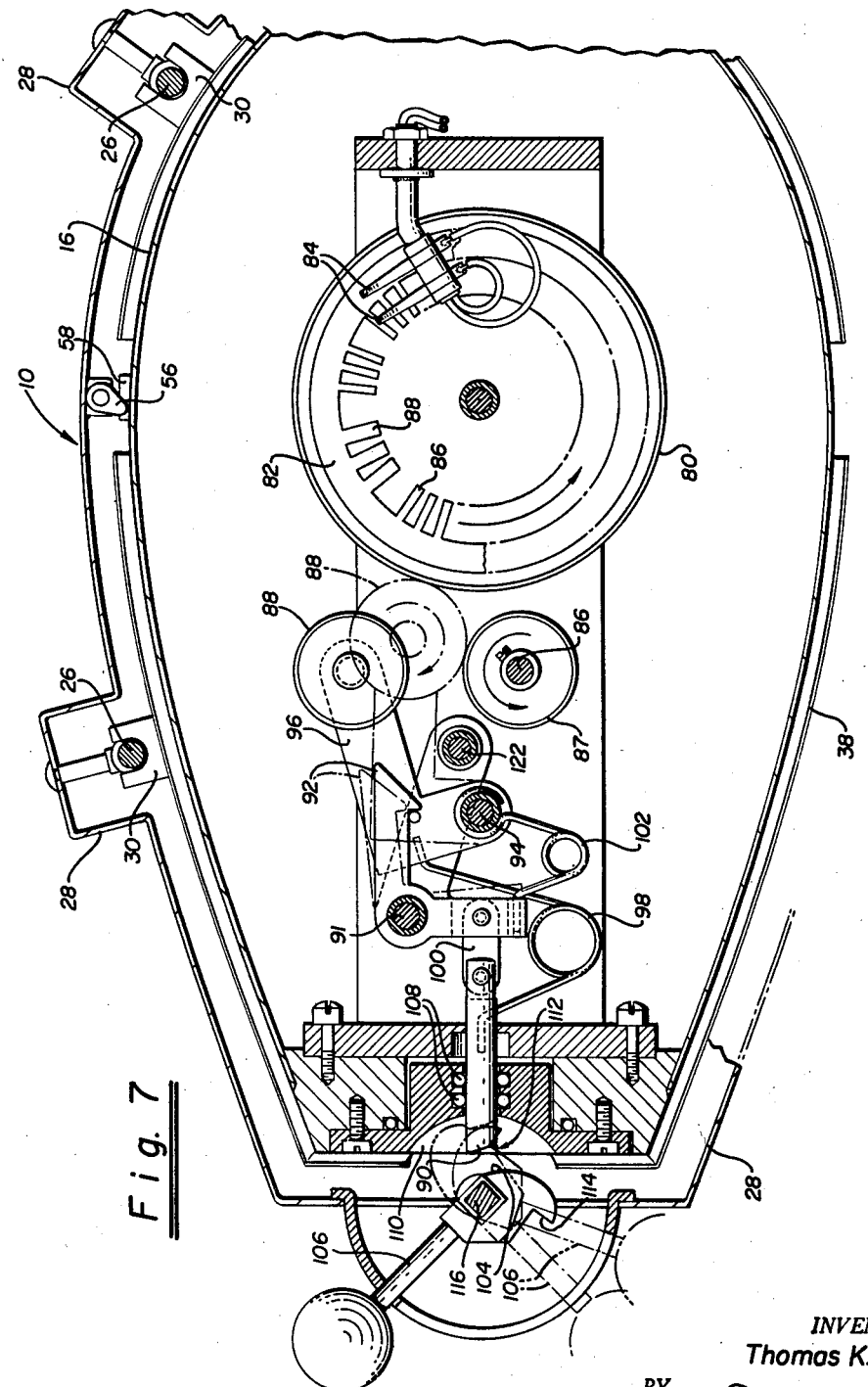
Figure 7 is an enlarged view in transverse section, illustrating details of the selector mechanism.

Considered broadly, the distress signaling device of the invention includes an outer housing adapted to project inwardly through the skin of an aircraft and to present an outwardly opening cavity, an inner robot containing a self-powered radio transmitter and having associated therewith a plurality of pre-recorded message units, and manually operable means in the aircraft for simultaneously energizing the radio transmitter and selecting one of the message units for transmission. The device also includes manually operable means carried by the outer housing for ejecting the robot, and a parachute associated with the latter to assure its safe descent. The structure just described can be quickly energized in an emergency situation and the robot ejected from the aircraft to transmit pre-selected information contained on one of the message units, for example, the ship's call number, the cause of the emergency and additional pertinent information as desired.

The robot is constructed to be water-tight, buoyant and shock resistant so that after landing the transmitted messages will also serve to indicate the distressed aircraft's position. When properly employed, the device of the invention will immediately alert the outside world of the nature and cause of an air disaster, will direct rescue forces to the precise location of the ditched aircraft, and will permit such forces to arrive quickly with essential equipment. More important, countless lives may be saved because lost time and man hours normally spent in searching wrong areas can be avoided.

Referring now to the drawings, Figure 1 illustrates the general arrangement of the parts at the precise instant of ejecting the transmitting robot through the skin of the aircraft, with reference number 10 indicating the outer housing positioned to project inwardly from the skin 12. The robot indicated at 14 includes the water tight buoyant housing 16 carrying the extensible antenna 18 and adapted to be supported by the parachute 20.

Figures 5–7 illustrate the manner in which the robot housing 16 is normally retained within the outer housing 10. Preferably, the two housings have substantially the same cross section with the robot having an enlarged base portion 22 accommodated by the enlargement 24 of the outer housing. The outer housing is provided with a series of guide rails 26, suitably mounted in the recessed portions 28, and adapted to cooperate with the guide elements 30 provided on the robot. In an inoperative or housed position of the robot, the inner guide elements 30 perform the additional function of compressing the ejection springs 32 against end supports 34 for the guide rails. As will be later explained in detail, a manually operable release mechanism 36 permits the springs 32 to eject the robot 14 from the outer housing and away from the aircraft, as in Figure 1.

It will be noted that one set of the guide elements 30 is mounted directly on the housing 16 of the robot, close to the base 22, and that another set is secured to a separable push plate 38. The push plate in turn engages a cap 40 which loosely engages the top of the robot in a "slip fit." The cap 40 houses and protects the parachute 20 and extensible antenna 18. Preferably the cap 40 is secured to the outer housing 10 by means of a lanyard 42, attached to the cap and extending through an aperture 44 in the push plate. The function of the lanyard is to effect a delayed removal of the cap 40 from the robot, after ejection, to thereby prevent fouling of the parachute within the outer housing 10 or with protruding portions of the aircraft structure.

As particularly illustrated in Figures 5 and 6, the release mechanism 36 is composed of the lever 46 which is manually operable to pivot a secondary lever system including the cross bar 48 keyed to the lever and the links 50 and 52. Each of the links 52 is pivotally carried by a shaft 54 which also carries a latch member 56. These latches, in a housed position of the robot, extend forwardly of stop elements 58 provided on the robot housing, and normally hold the robot against the pressure of the springs 32. It will be understood that manipulation of the lever 46 will cause the latch elements 56 to disengage from the stops 58, permitting ejection of the robot. If desired, the lever 46 can be secured against arridental operation by any suitable means such as the slide fastener 60.

In a housed position of the robot 14, it is necessary to provide some means for closing the gap between the outer housing 10 and the robot, to effectively seal out the weather. This may be accomplished by the provision of a kick plate 21 conformed to the shape of the skin of the aircraft at this point, and adapted to be pushed outwardly by the robot during ejection. Alternative means can also be provided, for example, the base of the robot may be shaped and fitted to conform to the opening in the outer housing, and the free space between the base of the robot and the housing sealed by means of a spongy, resilient gasket, tight enough to provide weather resistance without restraining ejection of the robot.

Upon ejection of the robot 14 and during its descent, the parachute 20 acts to insure a proper extension and functioning of the antenna 18. Means can also be provided to insure that the antenna will remain extended once the robot has reached the earth. Figure 3 illustrates a simple locking mechanism comprising the pivoted latch 62 having the projection 64 engageable upon rotation with the spring element 66. When the antenna is pulled erect by the parachute, the latch 62 is rotated into the locked position illustrated. As a further precaution, the antenna 18 is coiled about a central reinforcing member 68 of suitable resilience and strength and secured at either end to the robot and to the parachute. The purpose of the member 68 is to absorb the shock upon opening of the parachute and to insure that the attachment of the parachute to the robot is maintained.

One further feature of the robot 14 is the provision of a dye emitting compartment 70, which has particular usefulness should the robot land in a body of water. This compartment may comprise a hollow perforated chamber filled with a suitable dye material which exudes color when the chamber is flooded with water. It is also contemplated that the fabric of the parachute 20 can be treated with a material that will cause its chemical disintegration in the presence of moisture. Such disintegration will counteract any accidental shrouding of the robot by the parachute, such as might cause a shorting out of the antenna.

As previously indicated, the transmitting robot 14 is equipped with means permitting the transmission of information from any one of a series of pre-recorded message units or disks. In the illustrated apparatus (Figures 7 and 8), the message units comprise a series of disks 80 each provided with a pre-recorded message unit 82 adapted to alternately make and break a transmitting circuit to the antenna 18, through the contacts 84. Upon rotation of the disk 80, the circuit through the transmitter (not shown) is opened and closed in accordance with the particular message impressed on the unit 82. For example, it is contemplated that the disks will carry messages in International Morse Code such as "SOS" followed by the aircraft call letters and a code letter designating the particular emergency. Thus the circuit through the contact elements 84 will transmit a "dot" when the gap is closed by a narrow bridging element 86 (as in Figure 7) and will transmit a "dash" when the elements 84 are bridged by a relatively wider bridging element 88. Rotation of the disk 80 will therefore cause transmission of a series of "dots" and "dashes" in Morse code, corresponding to the message impressed on the disk. In a stationary or inoperative position, the contact elements 84 are preferably received in a depression provided between the bridging elements (e.g. between the end and beginning of the message) so as to normally break the circuit to the antenna.

Rotation of the message disks 80 can be accomplished by means of a drive shaft 86, powered by any suitable power source such as a battery-powered electric motor (not shown). Power takeoff can be achieved in a series of idlers 88, each of which is adapted to simultaneously contact a message disk 80 and the power shaft 86 or a suitable take-off disk 87 keyed to the shaft 86. The various disks and idlers can be provided with suitable surfacing adapted to insure proper traction and to prevent slippage such as might garble the transmitted message. I prefer a friction surfacing, such as rubber or other resilient material, although a roughened surface, gear teeth or other suitable means can be employed.

It is desirable that means for the external selection and actuation of a particular message disk 80 be provided. As illustrated, such means can include the selector buttons 90 adapted to pivoting the pawls 92 to permit a spring biasing of the idlers 88 into contact with the power take-off disks 87 and message disks 80. As best seen in Figure 7, the idlers 88 are mounted on the cross shaft 94 by means of the segmented carrier elements 96. The elements 96 are spring biased towards the message disks by means of the springs 98 engaged at one end with the buttons 90 and at the other end with the elements 96. The idlers 88 are normally held out of engagement with the message disks by engagement of the pawls 92 with pins 93 provided on carriers 96. The pawls 92 are connected to the buttons 90 by the links 100, and are biased into interlocking engagement with the carriers 96 by means of the spring elements 102.

The buttons 90 are capable of being actuated by the lever 106, and specifically by rotation of the cam 104 attached to the lever through an arc from the full line position to the dotted line position (Figure 7). The movement to dotted line position causes a pawl 92 to be rotated upward to thereby release a carrier 96, permitting its associated idler 88 to snap into the transmitting position in contact with a disk 80 and power take-off 87, as illustrated by the dotted line position.

It will be noted that each selector button 90 is suitably sealed against seepage of moisture into the interior of the robot housing by means of a series of O-rings 108. This is necessary as the buttons and the robot unit may undergo long periods of immersion during actual use. It will be further noted that the buttons are mounted in a longitudinally extending recess or cavity 110, and that the spaces between the buttons are filled by the blocks of material 112 having slightly beveled lower surfaces. The purpose of this construction is to prevent the selector lever from catching on any button during operation or while the robot housing is being ejected from the outer housing. The lever element 104 is also provided with a recess 114 for the same purpose, and also to lock the lever in the lower selective position. This prevents the operator from accidentally selecting more than one message for transmission. As will be explained, the shaft 116 for the selector lever is provided with a coil spring 118 normally biasing the lever upwardly into a position within the longitudinal or connecting channel 150.

To anticipate the possibility that one of the message disks 80 might be erroneously activated, it is desirable to provide a cancel mechanism 120. As illustrated (Figure 8), this mechanism includes a cross bar 122 extending below the carrier elements 96 and pivoted about the shaft 91 by means of the lever elements 124. The cross bar 122 is adapted to be pivoted upwards by inward movement of the button 126 connected to one of the levers 124 by means of the link 128. The button 126 is depressed by means of the external button 130 resiliently secured to the outer housing 10 by means of the element 132. Operation of the cancel mechanism serves to reposition all of the idlers 88 in the full line position illustrated in Figure 7. Operation of the cancel mechanism also serves to release the lever 106 by effecting a slight inward movement of the depressed button 90. This inward movement releases the button from the cam recess 114, allowing the spring 118 to disengage the cam and to swing the lever 106 to an uppermost position in channel 150. The selector lever can now be operated to select the desired correct message.

Referring to Figure 4, it can be seen that the selector lever 106 and cancel button 126 are immediately available to an operator within the aircraft. The release lever 46 is also within easy reach. This is important in the case of sudden accidents since the pilot and crew have very little time for emergency action, and generally have no time at all in which to send messages in the usual manner. With the device of the invention, however, it is only necessary to raise the lever 106, move it sidewise and depress it into the proper slot below the information desired to be transmitted and then pull the release lever 46 to eject the robot 14. Ejection of the robot therefore requires but a few seconds time yet permits transmission of a wide variety of emergency messages, for example, as suggested by the selector panel 140 in Figure 4.

It is desirable that the robot start transmission the minute it is ejected from the aircraft. This is made possible in the illustrated device by positioning of the control lever 106 in such manner that the power switch 142 for the power supply is normally held in a depressed or "off" position. Thus, as best seen in Figure 8, the off slot 146 for the lever can have an offset portion 147 to receive the lever so that the cam 104 will normally depress the external button 144. This button in turn through a proper linkage can act to hold the power switch 142 in the depressed "off" position. Upon releasing the lever 106 to select a particular message, the button 142 and switch 144 are simultaneously released to thereby energize the power supply to rotate the drive shaft 86. In this way, the selector lever provides a single means for simultaneously energizing the transmitter and for selecting a particular message disk 80.

The overall operation of the distress signaling device can now be summarized as follows:

Before each flight the transmitting robot 14 is removed, its power supply checked, and the device reinserted into the outer housing from the outside of the plane by the ground servicing crew. Prior to insertion, the lanyard 42 is secured to the ring 43 attached to the end of the ejector lever shaft. During insertion, the release lever 46 must be positioned in the eject position so that the stops 58 can pass inwardly of the latch element 56. Thereafter the lever 46 can be secured in an inoperative or holding position by the slide element 60. The selector lever 106 is now locked in "off" position in the offset portion 147 of the slot 146. This position of the selector lever depresses the button 142 and switch 144 to shut off the power supply.

Assume that the aircraft subsequently is in flight and that an uncontrollable fire breaks out. A member of the crew can take immediate steps to eject the transmitting robot to summon rescue forces by two simple manual operations. First the lever 106 is released from the slot 147, raised and then moved sideways to the slot 148 immediately below the "fire" indicator. This movement releases the switch 144 and energizes the power source to start the drive shaft 86 rotating. Upon depressing the lever 106 into the slot 148, the button 90 for the "fire" message disk is depressed to snap an idler 88 into power transmitting contact with the desired message disk 80. At the extreme downstroke, the lever 106 is locked into position by the button 90 moving outwardly into the recess 114 of the element 104. This prevents the operator from accidentally disengaging the message disk or otherwise counteracting his selection. In the event he has made an erroneous selection, the cancel button 126 can be depressed to raise the cross bar 122 to reposition the idler 88. This has the effect of releasing the selector lever 106 so that it can again be raised and depressed in the proper message slot as indicated on the selector panel 140.

The second action of the operator is to slide the catch 60 to one side and pull the release lever 46 through the arch indicated. The lever system associated with the release lever 46 causes the latch elements to be moved to one side so that the compressed springs 32 will act to eject the robot housing 14 outwardly from the skin of the aircraft, as in Figure 1. Just as the robot leaves the aircraft, the lanyard 42 acts to slip the cap 40 off the top of the robot, thereby allowing the parachute 20 to open free and erect the antenna 18. The pull of the parachute also serves to rotate the catch 64 into locking contact with the spring element 66 so that the antenna will be rigidly secured in the desired erect position.

The robot 14 is constructed to be substantially shockproof, waterproof and buoyant. Should it land in a body of water, its design will cause it to float in an erect position as illustrated in Figure 2. At the same time, water flooding the compartment 70 will cause emission of dye to color the surrounding water to further assist in the location of the robot and the ditched aircraft.

It will be observed that the foregoing distress signaling device provides a simple instantaneously operable device that can be ejected from an aircraft in distress to transmit desired preselected information and also to provide a signal on which rescue craft can home. While a specific preferred embodiment has been illustrated, many changes in construction and widely differing embodiments and applications of the invention will suggest themselves to those in this art without departing from the spirit and scope of this invention. For example, a propellant device might be employed instead of the springs 32 for purposes of ejecting the robot from the housing 10, or the general shape or configuration of the robot might be changed to insure greater shock resistance over land areas, etc. Accordingly, it will be understood that the disclosures and description herein are purely illustrative and not intended to be in any sense limiting.

I claim:

1. In a distress signaling device for aircraft, a watertight ejectable robot including a radio transmitter and an electrical power source for said transmitter, a series of pre-recorded message units contained within said robot and associated with said transmitter, water-tight means protruding from said robot and permitting a selective energizing of said transmitter to transmit the information contained on a single one of said message units, a parachute associated with said robot, a housing for said robot adapted to project inwardly through the skin of an aircraft and to present an outwardly opening cavity for said robot, means normally restrained, for ejecting said robot outwardly from the housing, movable means on said housing for simultaneously energizing said transmitter and for selecting a particular message unit from said series of units for transmission, and means for actuating said robot ejecting means, whereby in an aircraft emergency situation said robot can be hastily energized and ejected from the aircraft to transmit preselected information contained on one of said message units and also to indicate the aircraft's position.

2. The distress device of claim 1 wherein said robot is provided with a transmitting antenna at one end and a weighted dye compartment at the other, such structure adapting the robot to usefulness when ejected over a body of water.

3. The distress device of claim 2 wherein the parachute is secured to said antenna so as to extend the same during descent, said antenna being provided with locking means actuated by the parachute to hold the antenna in an upright position.

4. In a distress signaling device adapted to be carried by an aircraft, the combination of: an inner robot housing containing a self-powered radio transmitter, a plurality of pre-recorded message units, and means for energizing said radio transmitter to transmit the information contained on a single one of said message units; a parachute associated with said robot housing; an outer housing carried by the aircraft and enclosing said robot housing; manually operable means in said aircraft for energizing said radio transmitter and said means for selecting one of said message units; a second manually operable means in said aircraft for ejecting said robot housing and parachute from said aircraft; said robot housing being constructed to be both shock resistant and buoyant; whereby in an emergency situation said robot can be instantaneously ejected to parachute to the earth with transmission of a vital factual and position indicating message.

5. The device of claim 4 wherein said manually operable means for ejecting said robot housing includes compression springs.

6. An emergency signaling device and crash position indicator of a type adapted to be ejected from an aircraft at relatively high altitudes, comprising: an outer housing adapted to be mounted in the aircraft, an ejectable robot housing slidably positioned in the outer housing, means for latching said robot housing within the outer housing, manually operable means for releasing said latch means, means for ejecting the robot housing from the outer housing upon release of said latch means, a radio transmitter within said robot housing having associated therewith a series of pre-recorded message units, water-tight means adapted to external actuation for selecting one of said message units for transmission, second manually operable means for actuating said water-tight selection means, and pop-out means normally sealing the gap between said housings against the weather.

7. The device of claim 6 wherein said pop-out means is a resilient gasket.

8. The device of claim 6 wherein said pop-out means is a separable closure plate.

9. The device of claim 6 wherein the power source for said radio transmitter is automatically energized by operation of said manually operable selection means.

10. An emergency signaling and crash position indicator comprising a water-tight, buoyant, shock-resistant housing adapted to be ejected from an aircraft, said housing containing a radio transmitter, a power source therefor, and a series of pre-recorded message disks; a plurality of water-tight selector buttons corresponding to said series of message disks, a drive shaft connected to said power source, a plurality of idler disks corresponding to said message disks and adapted to cooperate with said power shaft to drive said message disks; each of said idler disks being adapted to actuation by selector button to drive a message disk; whereby actuation of one of said selector buttons will position its corresponding idler relative to the power shaft and its corresponding message disk to cause transmission of the message on said disk; whereby said device can relay a predetermined message while at the same time signaling the position of the indicator device.

11. The indicator device of claim 10 wherein said device includes a parachute attached to an extensible antenna of said transmitter, said antenna being mounted externally of the robot housing.

12. The device of claim 11 wherein said antenna is provided with locking means adapted to be actuated by parachute extension of said antenna, to hold the antenna in extended position.

13. The device of claim 10 wherein separate means are provided to disengage said idler disks from said power shaft, thereby to permit cancellation and reselection of the message being transmitted.

14. A distress signaling and crash position indicator comprising: a water-tight buoyant shock-resistant body; a transmitter contained within said body; said transmitter including a power source, a rotatable shaft, a plurality of pre-recorded message disks, idlers adapted to engage said shaft and said disks to rotate the latter, and circuit means adapted to relay the message from each disk to an extensible antenna mounted exteriorly of the body, water proof selector means associated with each idler to cause rotation of a selected disk and transmission of its message, and means operable to simultaneously disengage all idlers to thereby permit correction of an erroneously selected transmission.

References Cited in the file of this patent
UNITED STATES PATENTS

| | | |
|---|---|---|
| 2,500,809 | Fennessy et al. | Mar. 14, 1950 |
| 2,519,553 | Faulkner | Aug. 22, 1950 |